United States Patent [19]

Tisbo et al.

[11] Patent Number: 5,775,027
[45] Date of Patent: Jul. 7, 1998

[54] BORDER EDGING

[75] Inventors: Thomas A. Tisbo, Barrington Hills; Torrence C. Anderson; Michael R. Vogler, both of Aurora, all of Ill.

[73] Assignee: Suncast Corporation, Batavia, Ill.

[21] Appl. No.: 784,583

[22] Filed: Nov. 11, 1996

[51] Int. Cl.$^6$ ............................................. A01G 1/08
[52] U.S. Cl. ............................................................ 47/33
[58] Field of Search .................................................. 47/33

[56] References Cited

U.S. PATENT DOCUMENTS

| | | | |
|---|---|---|---|
| D. 329,575 | 9/1992 | Eberhart | D8/1 |
| D. 366,191 | 1/1996 | Gay | 47/33 X |
| 1,928,447 | 9/1933 | Cornell | 47/33 X |
| 3,373,668 | 3/1968 | Moore et al. | 47/33 X |
| 3,415,013 | 12/1968 | Galbraith | 47/33 X |
| 3,788,001 | 1/1974 | Balfanz | 47/33 |
| 5,456,045 | 10/1995 | Bradley et al. | 47/33 |
| 5,501,036 | 3/1996 | Torp et al. | 47/33 |

FOREIGN PATENT DOCUMENTS

| | | | |
|---|---|---|---|
| 2635432 | 4/1977 | Germany | 47/33 |
| 2945292 | 5/1981 | Germany | 47/33 |
| 3717877 | 12/1988 | Germany | 47/33 |

*Primary Examiner*—John A. Ricci
*Attorney, Agent, or Firm*—McHale & Slavin, P.A.

[57] ABSTRACT

A border edging landscaping device having a below-ground vertical anchoring barrier to inhibit vegetation growth with an above ground border comprised of box-like structures formed along the upper edge of the barrier. The length of the barrier is formed by interconnecting identically formed components with each component having a first end that operates as a receptacle for receipt of a circular shaped flange located along a second end of a similarly shaped device. Receptacle formation allows for placement in a straight line configuration or perpendicular positioning to form borders for landscaping. The box-like structures may assimilate a brick and are formed in various colors providing an aesthetically pleasing border edging device. A beveled and serrated edge allows forceful insertion of the device.

18 Claims, 2 Drawing Sheets

BORDER EDGING

FIELD OF INVENTION

This invention relates to the field of landscaping and in particular to a border edging device having a rectangular box-like structure along a top surface, an anchoring barrier extending below the structure, and a circular insertion flange and corresponding receptacle for adjoining devices for placing the devices in-line or in perpendicular positions.

BACKGROUND OF THE INVENTION

Lawn edging devices are barrier structures placed into the ground to inhibit vegetative growth. Edging devices are often used around walkways, trees, and shrubs to beautify a lawn or garden by containing dirt and grass from encroaching onto the edged object. Lawn edging devices can be placed into the ground by digging a trench or by forceful insertion.

The Applicant Corporation was granted U.S. Pat. No. 5,501,036 for an improvement in an edging device that provided a vertical barrier, the improvement directed to the formation of a receptacle means that allowed for storage of the edging without the need for an external box. This edging is typical of flexible edging devices requiring a trench to accommodate installation. The direction of the trench determines whether the edging is straight with 90 degree bends requiring either the bending or cutting of the device.

U.S. Pat. No. D329,575 discloses an edging device consisting of rigid parts which are hingably joined to form an edging wall. The thin profile of this wall allows the parts to be either trenched or hammered directly into the ground for placement around a landscaped area. Each part, however, presents no upper bordering or decorative surface which can be viewed by passersby. The adjoined parts serve only as a containment barrier existing below ground level. In addition, the parts cannot form a 90 degree bend making it unacceptable for many installations.

U.S. Pat. No. 5,456,045 discloses a lawn edge device comprised of an edging strip having living hinges and a contoured top surface to allow operation of the living hinges in the horizontal direction. The edging is joined together in-line wherein the living hinge provides an ability to bend and create sharp corners. Such flexibility in the parts, however, comes at the expense of a wavering top surface which may be difficult to hammer and inhibit a straight line installation. The wavering surface is also perpendicularly flush with the top of the strip and can be hammered flush with the ground surface. Again, no decorative feature is presented to a passing observer because in most cases the top surface will be covered or hidden by grass or other foliage. Moreover, even if the wavering top could be seen, it is thought by many persons to be generally unattractive around walkways and lawn items. In addition, a structural disadvantage of the '045 device is that the living hinge will continue to wear over time if used repeatedly to accommodate a changing landscape and may eventually break, especially when exposed to the extreme temperatures and related conditions of an outdoor environment.

Thus, what is lacking in the art is an easy to insert border edging device providing both a vertical barrier to inhibit vegetative growth and a decorative border that extends above the ground surface. The border edging device to allow positive positioning of the edging device in either a straight or perpendicular position.

SUMMARY OF THE INVENTION

The instant invention is a landscape product forming a combination border and edging device. The device is comprised of a plurality of rectangular box-shaped structures that assimilate a brick for creation of a distinctive landscaping layout. The device is formed to be interlockably connected with other such devices by having a first end that acts as a receptacle, and a second end that provides a flange for coupling to an adjoining receptacle. The device further consists of a vertical anchoring barrier having tapered tabs providing support to the box-like structure further allowing the barrier to be made of a thin walled material. In addition, the anchoring barrier may have an insertion end that is beveled and includes serrations so as to allow for ease of insertion.

The device is capable of being inserted forcefully into the ground by use of a mallet or even from the weight of an individual as applied by standing on the box-like structures. Each device consists of two box-like structures joined by the barrier with a first end of the device having a circular flange member that is insertable into a receptacle located along the second end of an adjoining border edging device. The receptacle end includes a plurality of slots allowing for placement of the adjoining border edging devices in either a straight line or perpendicular position.

The vertical anchoring barrier inhibits vegetation growth across the barrier while the box-like structures provide an aesthetic border that is viewed from above the ground. The box-like structures additionally prohibit excessive insertion of the device into the ground thereby maintaining a visible border that can be easily positioned at a predetermined height through uniform insertion. The edging device is constructed from plastic that allows for rigidity and is resistant to the environmental conditions to which it will be exposed. The box-like structure may include a texture and various colors, such as terra cotta or forest green, so as to further enhance the aesthetic appearance and versatility to the user.

Thus, an objective of the instant invention is to provide a combination edging device and landscape border capable of inhibiting vegetation growth across the barrier while the distinctive border is positionable at a uniform height.

Another objective of the instant invention is to provide a device that can be inserted into the ground in a forceful manner having an upper surface structure allowing for the impact of a mallet, the surface structure having peripheral support so as to prohibit damaging from excessive force during installation.

Still another objective of the instant invention is to provide a product having sufficient flexibility with conversing connections to allow creation of numerous landscape designs.

Yet still another objective of the instant invention is to provide a flange and receptor type coupling that allows for positioning of the border edging device in a straight line or in a perpendicular position with such rigidity so as to maintain either the straight line or perpendicular position despite the interference caused during insertion into a hard ground surface.

Another objective of the instant invention is to provide a thin, vertical anchoring barrier having a beveled edge with serrations that are reinforced by angular tabs extending down from the box-like structures, the tabs thereby assisting in ground installation.

Still another objective of the instant invention is to provide an aesthetically pleasing border edging device that may assimilate a line of colored bricks and is positionable in the ground so as to provide concealment of the anchoring barrier and thereby provide only exposure of the box-like structure.

3

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
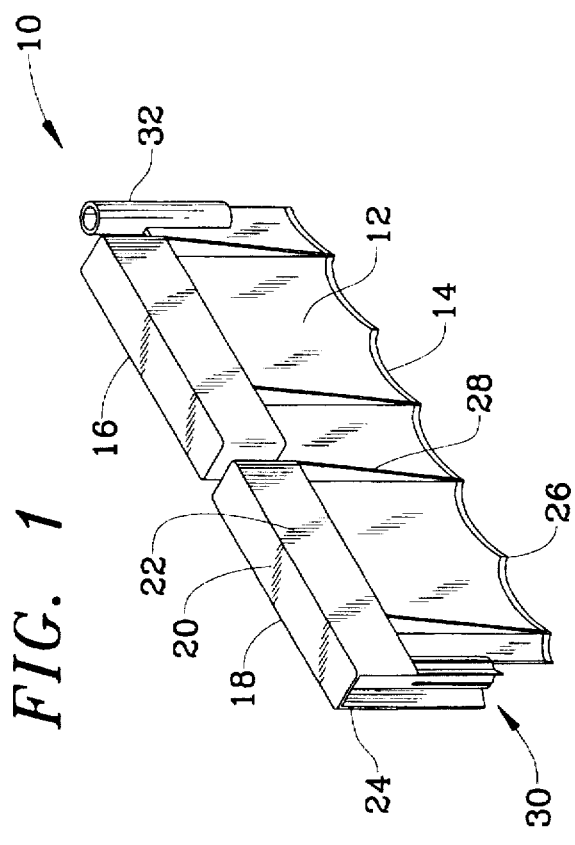
FIG. 1 is a perspective view of the instant invention.

Referring now to FIG. 1, illustrated is a perspective view of the border edging device 10 of the instant invention comprising a vertical anchoring barrier 12 having a blade portion 14 which operates as an insertion end and at least one box-like rectangular structure 16 formed integral to the vertical anchoring barrier 12 along an upper end. As depicted, the box-like structure 16 adjoins a second box-like structure 18, each having an upper surface 20 which may include a texture and opposing side surfaces 22 and 24 and an end closure providing the appearance of enlarged width similar to a brick silhouette. The blade portion 14 of the vertical anchoring barrier 12 is formed from a series of arches having tips 26 allowing for ease of insertion. The vertical anchoring barrier 12 includes tapered support tabs 28 extending from alternating tips 26 to the box-like structure so as to maintain the vertical barrier in a perpendicular fixed relationship to each box-like structure. A receptacle end 30 is located along a first end of the apparatus and includes a plurality of engagement slots (See FIG. 9). In particular, these slots are located along the end and in each side surface of the receptacle for engagement of insertion flange 32. The receptacle end 30 engages a circularly shaped insertion flange 32 on the associated border edging product wherein the insertion flange 32 is located along the second end of the apparatus 10. The insertion flange 32 consists of a finger-like structure sized to fit within the receptacle 30 having a flange support 36 of the vertical anchoring barrier which operates as an alignment mechanism for placement within the alignment slots of receptacle end 30.

Figure 2:
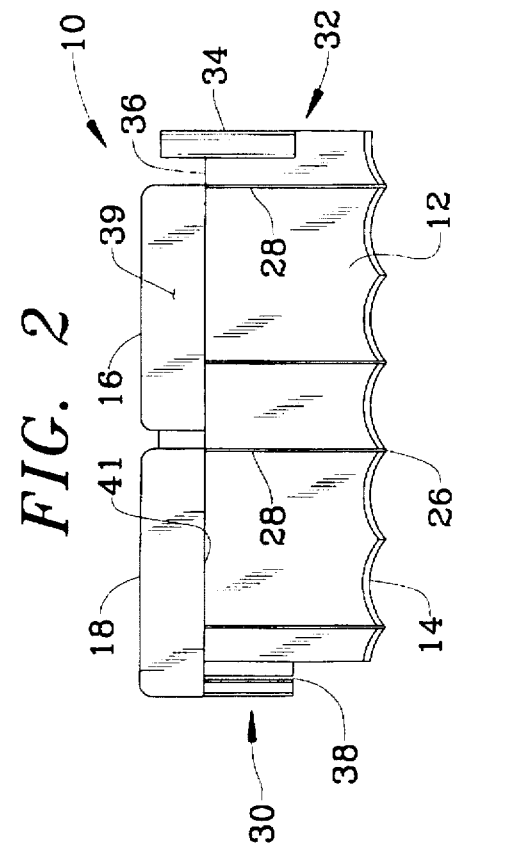
FIG. 2 is a side plane view.

Referring now to FIG. 2, the side view of the border edging device 10 further depicts the insertion end 32 defin-

Figure 9:
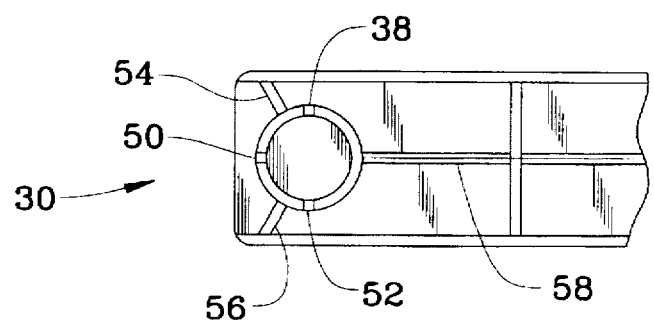
FIG. 9 is a bottom view of FIG. 7 depicting the opening slots allowing for either a straight or 90 degree coupling of multiple devices.

4 ing a finger-like structure 34 integrated into and forming a part of flange support 36 of the vertical anchoring barrier 12. As previously mentioned, the insertion flange 32 is insertable into an adjoining border edging device having a receptacle end 30 wherein flange support 36 is available for engaging a slot in the receptacle end 30. Receptacle end 30 has a side slot 38 viewable from the side view which would allow the apparatus to be placed in a perpendicular position to adjoining structures. Referring also to FIG. 9, in combination with FIG. 2, an opposite side slot 52 would allow opposite perpendicular placement of an adjoining border edging device, and a longitudinally oriented slot 50 would allow straight, in-line placement of an adjoining apparatus 10.

Figure 3:
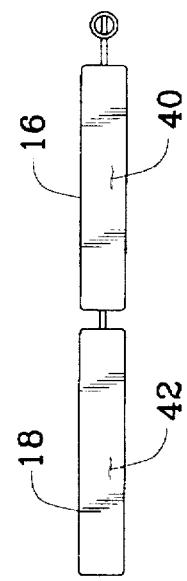
FIG. 3 is a top view.

Referring to FIG. 2 and 3, the box-like structures 16 and 18 are depicted, wherein the upper surfaces 40 and 42 have a length of about 5.6 inches and width about 1.5 inches so as to assimilate a larger, continuous barrier when a number of apparatus parts 10 are joined together. The height of the border wall 39 is about 1.44 inches with a flat lower edge 41 that inhibits excessive insertion. The overall length between the receptacle chamber and insertion flange is 12 inches allowing for ease in estimating landscaping requirements. The overall height of the device is about 5.5 inches with the tabs 28 forming an angle of about 10.4 degrees from the tip 26 of the blade 14 to the bottom 41 of the box-like structure. The width of surfaces 40 and 42 provide an area that assists an individual during the installation of the barrier, providing an enlarged surface area that allows an individual to use a hammer or available weighted object on the surface allowing for the insertion of the blade having a nominal thickness of about 0.125 inches. Such weighted objects might include, for instance, the heel of a foot so as to assist in insertion of the barrier, and thereby avoid the need to first form a trench for sinking the barrier underground. The surface area of the structures 16 and 18 may be textured for aesthetic purposes. Such textured surfaces might further serve to conceal marks and scratches, should an individual choose to use a hammer during the installation process.

Referring again to FIG. 2, the tapered support tabs 28, as previously described, extend from the tip 26 of the blade portion 14 and provide support to the box-like structures 16 and 18, while further maintaining the vertical anchoring barrier 12 in a rigid position during the installation stage. It is noted that the barrier is formed from plastic which allows minute flexibility which prevents stressing the coupling points upon installation. The vertical tabs 28 allow the vertical anchoring barrier 12 to be made from a relatively thin walled material, further assisting in the ease of installation of the device. The vertical tabs 28 also allow the blade portion 14 to be beveled, thereby further reducing or eliminating the need for the formation of a trench before structure insertion.

Figure 4:
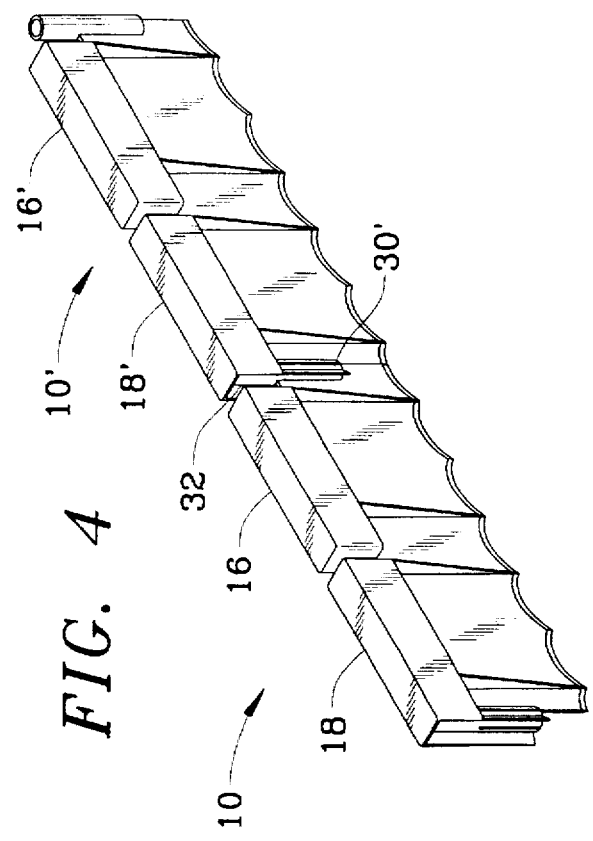
FIG. 4 is a perspective view of two of the devices coupled together in a straight line.

In further reference to FIG. 2, it is noted that the receptacle end 30 does not extend the full height of the barrier 12. Moreover, the insertion end 32 limits the height of the barrier 12 along flange support 36 to the bottom of the box-like structure. The depth and height restrictions for the receptacle end 30 and insertion ends 32 are further illustrated in FIG. 4 which shows the apparatus 10 coupled to a second apparatus 10', wherein the box-like structures 16, 18 and 16', 18' are placed in a straight line configuration wherein the insertion end 32 is coupled to the receptacle end 30' of the second device. The operation of the receptacle and insertion ends allows the box-like structures to be maintained in a straight line configuration with a similar height throughout the assembly. This configuration further facilitates a concealment of the coupling joint which is placed beneath the viewing area of an observer to the device once it is installed.

Figure 5:
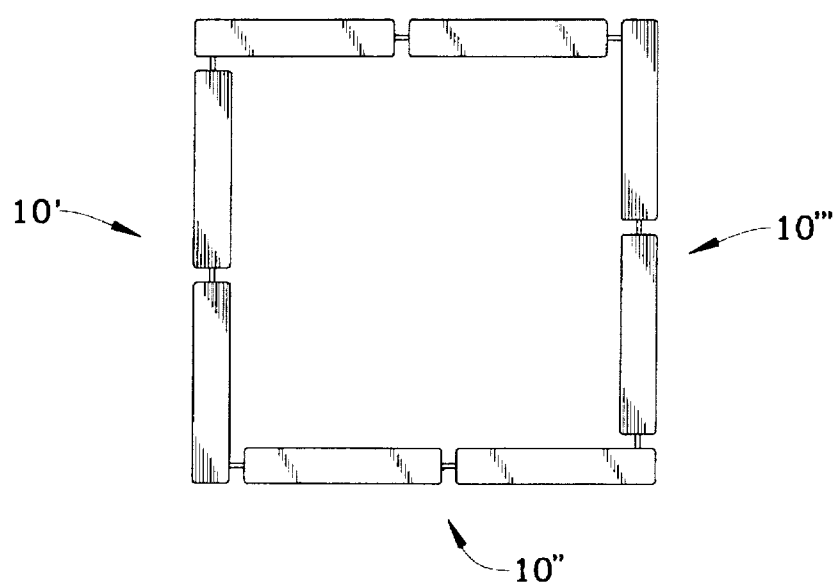
FIG. 5 is a top view of four of the devices coupled into a square configuration.

Referring now to FIG. 5, this unique coupling of the apparatus parts 10, 10', 10", and 10''' allows a consumer to place the device in numerous positions, without the need for bending of the plastic, by simply rotating the circularly shaped insertion flange 32, with its finger-like projection 34, within an adjoining receptacle 30 so as to align with flange support 36 of the vertical barrier in the associated slot. The embodiment having slots in receptacle end 30 which are oriented 90 degrees apart. It is noted that other slots might also be included at other angular orientations. Such slots thereby allow geometrical placement and formations of the adjoining devices, such as the continuous square shown, wherein the insertion causes the concealment of the coupling joints.

The apparatus parts 10, 10', 10", and 10''' when all coupled together form an overall barrier wherein only the box-like structures, and a portion of each of the vertical blades located between each box-like structure and between the structure and the insertion end, can be viewed by the consumer. In this manner, once the product is inserted into the ground, the bottom of the box-like structure helps prohibit over-insertion of the device, thereby causing the edging product to operate as a border that is evenly placed and of uniform height. The product can be made from various plastic materials of various colors and textures so as to assimilate bricks. The exposed upper box-like structures thereby form a border around a lawn object, while the anchoring barrier provides an inhibitor of weeds from passing from one side of the barrier to the other.

Figure 6:
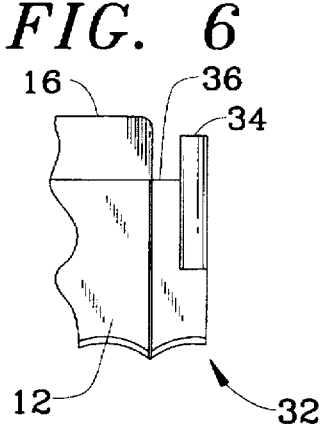
FIG. 6 is a partial end view of the device depicting the insertion end.

Referring now to FIG. 6, a partial view of circularly shaped insertion flange 32, with its finger-like projection 34, formed integral to the barrier 12 as flange support 36 is illustrated. The circular shaped flange 32 and projection 34 are formed integral to the flange support 36 and spaced apart from the box-like structure 16 a predetermined distance so as to allow an adjoining box-like structure, having a receptacle end, to cause the same placement between the receptacle end and the insertion end as that found between box-like structures 16 and 18 on the same apparatus part 10.

Figure 7:
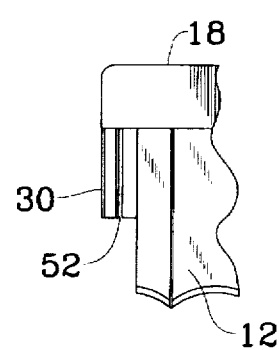
FIG. 7 is a partial view of the opposite end of the device showing the receptacle end.

FIG. 7 depicts the receptacle end 30 formed integral to box section 18 and having a circular shape forming a chamber receptive to the circularly shaped flange. The chamber includes three slots, as depicted in FIG. 9 and enumerated 38, 50, and 52, which allows for placement of flange support 36. Perpendicular placement to the right side is achieved if the flange support 36 is placed in slot 52, and to the left side if flange support 36 is placed in slot 38. Placement of the parts is achieved in a straight line if flange support 36 is placed into slot 50. It will be obvious to one of ordinary skill in the art that multiple slots, in addition to those mentioned, may be formed so as to allow placement of subsequent barriers in positions other than a straight or perpendicular situation. It is also noted that the receptacle end 30 is reinforced by support tabs 54, 56 and 58 maintain the strength of each slot position by the immediate reinforcement to an adjoining wall.

Figure 8:
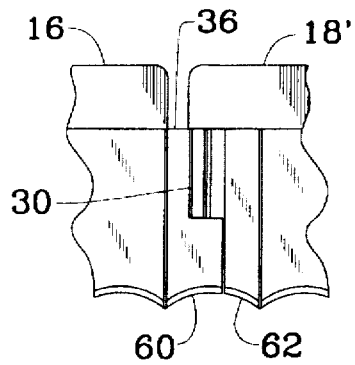
FIG. 8 depicts the device in a coupled position.

Referring now to FIG. 8, the box-like structure 16 is coupled to second box-like structure 18' on an adjoining device part wherein receptacle end 30 is positioned over the circular shaped flange. By way of reference, it is noted that the vertical anchoring flange support 36 includes a partial arch 60 as part of the insertion end, while the receptacle end 30 has a partial arch 62 which results in a complete arch formation which further allows for ease of insertion into the ground. The result is a lawn edging product that creates a decorative border, wherein the box-like structure creates an aesthetically shaped above ground border which serves to keep mulch or stones in a flower bed if placed in such a position. Simultaneously, the vertical anchoring barrier extending below ground operates to block weeds and grass in a landscaping situation.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A border edging device comprising:
   a one piece structure characterized by a vertical barrier of nominal thickness having a first end and a second end forming a length therebetween, said barrier having a top edge and a bottom edge; at least one rectangular box-like structure defined by a top wall having a length and a width with an upper surface and a lower surface and four side walls depending therefrom, said lower surface formed integral to said top edge of said barrier; a receptacle having at least one vertical slot formed along said first end of said structure allowing for the slidable insertion of an insertion flange from an adjoining vertical barrier therein; an insertion flange formed along said second end of said structure; whereby said insertion flange is sized to slidably insert into a vertical slot of a receptacle formed in an adjoining border edging device allowing for the coupling of multiple border edging devices in series.

2. The border edging device according to claim 1 wherein said vertical slot maintains a first border edging device in a rigid position to a second border edging device.

3. The border edging device according to claim 2 wherein said vertical slot maintains a first border edging device in-line with or perpendicular to a second border edging device.

4. The border edging device according to claim 1 wherein said four side walls are of equal height.

5. The border edging device according to claim 1 wherein said bottom edge of said vertical barrier forms an insertion end whereby said insertion end withstands forceful insertion into the ground.

6. The border edging device according to claim 1 wherein said insertion flange includes serrations.

7. The border edging device according to claim 1 wherein said insertion flange is beveled to form a blade.

8. The border edging device according to claim 1 wherein said vertical barrier includes a plurality of tapered support tabs formed perpendicular to said insertion flange.

9. The border edging device according to claim 1 wherein said box-like structure assimilates a brick.

10. The border edging device according to claim 1 wherein said upper surface of said top wall is textured.

11. The border edging device according to claim 1 wherein said receptacle forms one of said four side walls.

12. A border edging device comprising:
    a one piece plastic structure characterized by a vertical barrier of nominal thickness having a first end and a second end forming a length therebetween, said barrier having a top edge with a bottom edge forming an insertion end, and a plurality of tapered support tabs formed perpendicular to said insertion end; at least one rectangular box-like structure defined by a top wall having a length and a width with an upper surface and a lower surface and four side walls depending therefrom, said lower surface formed integral to said top edge of said barrier; an insertion flange formed along said second end of said structure; a receptacle formed along said first end of said structure, said receptacle having a plurality of vertical slots;

whereby said insertion flange sized to slidably insert into a receptacle formed in an adjoining border edging device allowing for the coupling of multiple border edging devices in a series arrangement, said vertical slots sized for the slidable insertion onto a vertical barrier of an adjoining border for maintaining a first border edging device in a rigid position to a second border edging device in-line with or perpendicular to the second border edging device.

13. The border edging device according to claim 12 wherein said four side walls are of equal height.

14. The border edging device according to claim 12 wherein said insertion end includes serrations.

15. The border edging device according to claim 12 wherein said insertion end is beveled to form a blade.

16. The border edging device according to claim 12 wherein said box-like structure assimilates a brick.

17. The border edging device according to claim 12 wherein said upper surface of said top wall is textured.

18. The border edging device according to claim 12 wherein said vertical barrier is flexible.

* * * * *